US008842539B2

(12) United States Patent
McGrath et al.

(10) Patent No.: US 8,842,539 B2
(45) Date of Patent: Sep. 23, 2014

(54) METHOD OF LIMITING THE AMOUNT OF NETWORK TRAFFIC REACHING A LOCAL NODE OPERATING ACCORDING TO AN INDUSTRIAL ETHERNET PROTOCOL

(75) Inventors: Kevin McGrath, Oslo (NO); Alexander Wold, Sofiemyr (NO)

(73) Assignee: ABB Research Ltd. (CH)

( * ) Notice: Subject to any disclaimer, the term of this patent is extended or adjusted under 35 U.S.C. 154(b) by 247 days.

(21) Appl. No.: 13/342,459

(22) Filed: Jan. 3, 2012

(65) Prior Publication Data
US 2012/0140630 A1 Jun. 7, 2012

Related U.S. Application Data

(63) Continuation of application No. PCT/EP2009/058371, filed on Jul. 2, 2009.

(51) Int. Cl.
*H04L 1/00* (2006.01)
*H04L 29/06* (2006.01)
*H04L 12/801* (2013.01)
*H04L 12/823* (2013.01)

(52) U.S. Cl.
CPC .............. *H04L 47/10* (2013.01); *H04L 63/101* (2013.01); *H04L 63/162* (2013.01); *H04L 63/0227* (2013.01); *H04L 47/32* (2013.01)
USPC ........................................................ 370/235

(58) Field of Classification Search
USPC ............... 370/389, 392; 709/225; 726/23, 13; 708/300
See application file for complete search history.

(56) References Cited

U.S. PATENT DOCUMENTS

| 5,608,662 | A | * | 3/1997 | Large et al. .................... 708/300 |
| 6,434,118 | B1 | | 8/2002 | Kirschenbaum |
| 7,280,591 | B2 | | 10/2007 | Sung |
| 2004/0073671 | A1 | * | 4/2004 | Maria et al. .................... 709/225 |
| 2007/0110053 | A1 | * | 5/2007 | Soni et al. ...................... 370/389 |
| 2007/0118894 | A1 | * | 5/2007 | Bhatia ............................. 726/13 |
| 2007/0143846 | A1 | * | 6/2007 | Lu ................................... 726/23 |
| 2009/0201808 | A1 | * | 8/2009 | Bettink et al. ................. 370/230 |
| 2010/0031340 | A1 | * | 2/2010 | Batke et al. ..................... 726/13 |

OTHER PUBLICATIONS

International Preliminary Report on Patentability; Application No. PCT/EP2009/058371; Issued: Jun. 24, 2011; 15 pages.
International Search Report and Written Opinion of the International Searching Authority; Application No. PCT/EP2009/058371; Issued: Jan. 14, 2010; Mailing Date: Jan. 21, 2010; 15 pages.

* cited by examiner

*Primary Examiner* — Andrew Lai
*Assistant Examiner* — Jamaal Henson
(74) *Attorney, Agent, or Firm* — St. Onge Steward Johnston & Reens, LLC

(57) ABSTRACT

A method of limiting the amount of network traffic reaching a local node in an electronic device operating an Ethernet networking protocol and using a network stack including at least one physical layer (PHY) and one link layer, preferably a media access controller (MAC). The electronic device is connected to a communication network, the network traffic is filtered, and an unwanted data reception is filtered out. Filtering the network traffic takes place during reception. Network traffic is inspected, and if an unwanted reception is detected, the unwanted data is discarded when it reaches media access controller (MAC) of the network stack of the electronic device. An electronic device, functioning as a node, embodying aspects of the invention is described, and a computer program for carrying out the invention is also described.

20 Claims, 4 Drawing Sheets

US 8,842,539 B2

METHOD OF LIMITING THE AMOUNT OF NETWORK TRAFFIC REACHING A LOCAL NODE OPERATING ACCORDING TO AN INDUSTRIAL ETHERNET PROTOCOL

CROSS-REFERENCE TO RELATED APPLICATIONS

The present Application is a continuation of pending International Patent Application PCT/EP2009/058371, filed on Jul. 2, 2009, which designates the United States, and the content of which is incorporated herein by reference.

FIELD OF THE INVENTION

The present invention is concerned with an electronic device used in an industrial context. In particular it is concerned with an electronic device used in or connected to a system for monitoring and control such as a system for generation, transmission or distribution of electricity or for an industrial process control system.

BACKGROUND OF THE INVENTION

Many electronic devices in modern control systems are arranged with some kind of built-in intelligence. Such devices are often a part of or referred to as embedded devices. Control systems for industrial process control and systems for control in generation, distribution and transmission of electricity are often connected to the industrial equipment the control system monitors and controls via one or more data communication networks that use open protocols such as Ethernet based protocols. This has standardised and simplified industrial data communication for the purposes of monitoring and control. Electronic devices that may be connected to a control system using an industrial Ethernet standard are included in many and various devices, for example instruments such as sensors or transducers, actuators such as valves, motors, pumps, switches, as well as controls on major equipment such as generators, transformers, breakers, power trains and so on.

Due to limited processing resources, resource constrained electronic devices or embedded devices can easily be overwhelmed by deliberate (or accidental) excessive network traffic. Under such conditions packet filtering is needed in order to limit the amount of traffic. Legitimate traffic needs to pass while at the same time unwanted traffic has to be discarded. Because of the limited processing resources of a resource constrained electronic device, it is challenging to implement this functionality as a software solution in a small electronic device with limited computing resources.

Network traffic filtering is generally done with software filtering, or an external firewall, or a combination of those. External firewalls requires additional engineering, and may rely on products manufactured by third parties. In such firewalls or software filters, the filtering of network traffic takes place after the packet is received by the filtering system.

U.S. Pat. No. 6,434,118 entitled Method for determining round trip time utilizing ATM traffic management mechanism, assigned to 3COM Corporation, mentions in the context of testing to establish a round trip time that a CRC error can be purposely placed in a Ethernet frame which causes the MAC layer in the destination to drop the frame and prevent it from reaching the upper layers.

U.S. Pat. No. 7,280,591 entitled Integrated reduced media independent interface, assigned to Via technologies, describes an integrated reduced media independent interface (Integrated RMII) and related method for interconnecting a MAC Circuit and a PHY Circuit.

US 2004/073671 discloses a method and apparatus for filtering packets using a dedicated processor. A dedicated data packet filtering processor is proposed whose only function is to filter data packets based on a list of source IP addresses stored in high-speed memory of the processor. The only function of the processor is to look at the source IP address of each received data packet to determine if the source IP address matches one of the stored source IP addresses, and if there is a match, to either discard or forward the data packet depending on the processor configuration.

US 2007/143846 discloses a system and method for detecting network-based attacks on electronic devices and to filter out attack packets. Properly designed packet filtering can drop malicious packets and useless packets, which provides information about potential network-based attacks. With multi-stage packet filtering, the unwanted packets are filtered out as early as possible.

SUMMARY OF THE INVENTION

The aim of the present invention is to remedy one or more of the above mentioned problems. This and other aims are obtained by a method characterised by aspects of the invention disclosed herein.

According to a first aspect of the invention a method is disclosed to limit the amount of network traffic reaching a local node in an electronic device operating an Ethernet networking protocol and using a network stack comprising at least one physical layer communicating with to at least one link layer where the data received is propagated to one or more higher layers of said network stack, said electronic device being connected to a communication network, in which method said network traffic is filtered and an unwanted data reception addressed to said electronic device filtered out, said method comprising receiving said network traffic in at least one said physical layer of said electronic device, detecting a said unwanted data reception, and discarding the said unwanted data reception in a link layer device or media access controller (MAC) before it reaches another higher layer of said network stack of said electronic device.

According to another embodiment of the invention, a method is disclosed to limit the amount of network traffic reaching a local node in an electronic device operating an Ethernet networking protocol and using a network stack comprising at least one physical layer communicating with to at least one link layer where the data received is propagated to one or more higher layers of said network stack, said electronic device being connected to a communication network, in which method said network traffic is filtered and an unwanted data reception addressed to said electronic device filtered out, said method comprising in which said filtering comprises inspecting said network traffic during reception and propagation from the at least one said physical layer to at least one said link layer, and comparing said network traffic with information from an access control list.

According to another embodiment of the invention, a method is disclosed to limit the amount of network traffic reaching a local node in an electronic device operating an Ethernet networking protocol and using a network stack comprising at least one physical layer communicating with to at least one link layer where the data received is propagated to one or more higher layers of said network stack, said electronic device being connected to a communication network, in which method said network traffic is filtered and an unwanted data reception addressed to said electronic device filtered out, said method comprising detecting said unwanted data reception and asserting a control signal in a media access controller of the said electronic device by switching a line, bus or circuit to a predetermined potential such that a media access controller (MAC) of the link layer rejects the said unwanted data reception transmitted from the physical layer.

According to another embodiment of the invention, a method is disclosed to limit the amount of network traffic reaching a local node in an electronic device operating an Ethernet networking protocol and using a network stack comprising at least one physical layer communicating with to at least one link layer where the data received is propagated to one or more higher layers of said network stack, said electronic device being connected to a communication network, in which method said network traffic is filtered and an unwanted data reception addressed to said electronic device filtered out, said method comprising asserting a control line (9) on detection of a said unwanted data reception such that the media access controller (MAC) detects a receiver error (RX_ERROR) and/or negated data valid (RX_DV) and/or other control line and discards the whole Ethernet frame containing said unwanted data reception.

According to another embodiment of the invention, a method is disclosed to limit the amount of network traffic reaching a local node in an electronic device operating an Ethernet networking protocol and using a network stack comprising at least one physical layer communicating with to at least one link layer where the data received is propagated to one or more higher layers of said network stack, said electronic device being connected to a communication network, in which method said network traffic is filtered and an unwanted data reception addressed to said electronic device filtered out, said method comprising logging data concerning discarded unwanted data packets and recording characteristics about the network traffic. An advantage of this embodiment is that information may be gathered about the occurrence of discarded data packets at a greater rate than a predetermined level. This information may be used in an access control list such as a white list or a blacklist. The information may also be used to investigate a cause of unwanted data packets or to identify a way to avoid the unwanted packets According to another embodiment of the invention, a method is disclosed to limit the amount of network traffic reaching a local node in an electronic device operating an Ethernet networking protocol and using a network stack comprising at least one physical layer communicating with to at least one link layer where the data received is propagated to one or more higher layers of said network stack, said electronic device being connected to a communication network, in which method said network traffic is filtered and an unwanted data reception addressed to said electronic device filtered out, said method comprising switching on filtering dependent on a number of data packets received per unit time, and then inspecting said network traffic during reception from the at least one said physical layer (PHY) to at least one said link layer or media access controller (MAC). An advantage of this embodiment is that the filtering may be activated when a need is perceived is not activated unnecessarily. This information may also be combined with other data reception information to determine when filtering may be switched on or off.

According to another embodiment of the invention, a method is disclosed to limit the amount of network traffic reaching a local node in an electronic device operating an Ethernet networking protocol and using a network stack comprising at least one physical layer communicating with to at least one link layer where the data received is propagated to one or more higher layers of said network stack, said electronic device being connected to a communication network, in which method said network traffic is filtered and an unwanted data reception addressed to said electronic device filtered out, said method comprising switching on filtering dependent on an external signal and then inspecting said network traffic during reception from the at least one said physical layer (PHY) to at least one said link layer or media access controller (MAC): or by switching on filtering dependent on the number of data packets received per unit time according to at least one predetermined number of data packets.

According to another embodiment of the invention, a method is disclosed to limit the amount of network traffic reaching a local node in an electronic device operating an Ethernet networking protocol and using a network stack comprising at least one physical layer communicating with to at least one link layer where the data received is propagated to one or more higher layers of said network stack, said electronic device being connected to a communication network, in which method said network traffic is filtered and an unwanted data reception addressed to said electronic device filtered out, said method comprising inspecting said network traffic during reception from the at least one said physical layer (PHY) beginning inspection on data forming a partially received data packet. An advantage of this embodiment is that an unwanted data packet may be detected without waiting for the whole frame to be processed, thus conserving resources.

According to another embodiment of the invention, a method is disclosed to limit the amount of network traffic reaching a local node in an electronic device operating an Ethernet networking protocol and using a network stack comprising at least one physical layer communicating with to at least one link layer where the data received is propagated to one or more higher layers of said network stack, said electronic device being connected to a communication network, in which method said network traffic is filtered and an unwanted data reception addressed to said electronic device filtered out, said method comprising inspecting said network traffic during reception from the at least one said physical layer (PHY) beginning inspection on receipt of a complete data packet.

According to another embodiment of the invention, a method is disclosed to limit the amount of network traffic reaching a local node in an electronic device operating an Ethernet networking protocol and using a network stack comprising at least one physical layer communicating with to at least one link layer where the data received is propagated to one or more higher layers of said network stack, said electronic device being connected to a communication network, in which method said network traffic is filtered and an unwanted data reception addressed to said electronic device filtered out, said method comprising inspecting said network traffic during reception from the at least one said physical layer (PHY) to at least one said link layer or media access controller by comparing with data in any from the group of: a list of accepted traffic, information based on an analysis of traffic, a list updated by a processor of said electronic device, a list of non-accepted traffic, an access control list.

In the first aspect of the invention a method is provided which limits the effects of some network denial of service attacks on an embedded networked device. The method increases the responsiveness of resource-constrained systems suffering from a an accidental or deliberate excess of network traffic such as during a denial of service (DOS) attack. The method limits the amount of data received by the network stack of an electronic device such as an embedded device, thereby reducing central processing unit (CPU) utilization. The term CPU is used to describe both microprocessors and microcontrollers. Based on certain parameters, only selected traffic is allowed to propagate through the network stack of the electronic device, with zero or constant near zero latency being added by this filtering process. By inspecting traffic during reception and rejecting a transmission detected to be unwanted, the unwanted traffic is stopped before it reaches the CPU. This way, legitimate traffic can pass with zero or constant near zero latency. The term "during reception" refers to a packet which is in the process of being received by the electronic device.

An important advantage of the described method and circuit is that network traffic is filtered without affecting latency because the filtering of packets takes place during propagation, meaning during reception in the electronic device. There is no pre-filtering. The data packets are filtered while they are being received by the electronic device.

Another advantage is that this invention may be implemented in an embedded system in a simple way. Preferably a hardware circuit such as a field programmable gate array (FPGA) or application-specific integrated circuit (ASIC) is connected between two circuits of the electronic device.

The invention could also be integrated directly in the PHY circuit or the media access controller (MAC) circuit, or integrated in a CPU. CPUs targeting networked embedded systems often contain a MAC and the invention could then be integrated with such a CPU, or another CPU which has an integrated MAC and also further a CPU that has a MAC and a PHY integrated.

The invention can also be extended with further ways to detect unwanted traffic, however this description does not elaborate on ways of detecting unwanted traffic, but rather describes how detected unwanted traffic is stopped with minimal latency.

One technical result of this invention implemented in an electronic device is increased network robustness at a low cost. Another advantage when compared to an external firewall, is that the invention also does not require user configuration, or additional engineering tools. Further, a deterministic constant latency firewall, may have use cases in low latency real-time Ethernet applications. In electronic devices or systems which already employ a circuit such as a field programmable gate array (FPGA), using the methods, teachings and so on of an embodiment of the invention it is likely that these features will add little or no additional costs to the existing production cost of the electronic device.

As noted above, an advantage of the described method is the zero or constant near zero latency introduced when filtering. A frame, Ethernet frame, packet and data packets and variations of the terms have a similar meaning in this description. Known firewalls typically read the whole Ethernet frame before making a decision on how to handle the packet. The Ethernet frame is then either transmitted or discarded. Reading the complete frame introduces additional latency, which latency is also variable dependent on the frame length, and may be considerable depending on the structure or content of one or more of the data packets.

In contrast, the described method filters network traffic with a zero or constant near zero latency. The filtering happens after reception has started in the physical layer, while the received frame is propagated to the Ethernet MAC. The detection part of the filtering may be started on data forming a partially received data packet. The detection may also or instead be carried out only after a complete data packet has been received. In any case, if an unwanted frame is detected, the RX_ERROR bus line or other control signal of the media independent interface bus (MII), or similar bus is asserted. When the Ethernet MAC detects this control signal the frame is dropped as though it contained an error. Alternatively on a high speed serial bus not having separate control and data signals, control data can be appended to the frame in order achieve the same result.

According to another aspect of the invention, an electronic device is disclosed comprising a local node arranged for operation according to an Ethernet networking protocol using a network stack comprising at least one physical layer (PHY) and communication to at least one link layer or media access controller, said electronic device having a serial interface for connection to a communication network, wherein said network traffic to said electronic device may be filtered and an unwanted data reception addressed to said electronic device filtered out, which electronic device also comprises a filtering unit connected between said at least one physical layer (PHY) and the link layer or media access controller (MAC), the filtering unit being arranged with at least one switchable line or bus and control logic for inspecting said network traffic during reception from the at least one said physical layer to at least one said link layer or media access controller, and for comparing said network traffic to at least one access control list and for detecting a said unwanted data reception, the filtering unit being arranged for sending a signal causing the selected said unwanted data reception to be rejected and discarded by the at least one said link layer or media access controller before it reaches another layer of said network stack.

According to another embodiment of the invention, an electronic device is disclosed comprising a local node arranged for operation according to an Ethernet networking protocol using a network stack comprising at least one physical layer (PHY) and communication to at least one link layer or media access controller, said electronic device having a serial interface for connection to a communication network, wherein said network traffic to said electronic device may be filtered and an unwanted data reception addressed to said electronic device filtered out, wherein the electronic device also comprises that the filtering unit is arranged for asserting a control line error by means of the switchable line or bus, upon detection of a said unwanted data reception.

According to another embodiment of the invention, an electronic device is disclosed comprising a local node arranged for operation according to an Ethernet networking protocol using a network stack comprising at least one physical layer (PHY) and communication to at least one link layer or media access controller, said electronic device having a serial interface for connection to a communication network, wherein said network traffic to said electronic device may be filtered and an unwanted data reception addressed to said electronic device filtered out, wherein the filtering unit of the electronic device is arranged for appending control data upon detection of a said unwanted data reception.

According to another embodiment of the invention, an electronic device is disclosed comprising a local node arranged for operation according to an Ethernet networking protocol using a network stack comprising at least one physical layer (PHY) and communication to at least one link layer or media access controller, said electronic device having a serial interface for connection to a communication network, wherein said network traffic to said electronic device may be filtered and an unwanted data reception addressed to said electronic device filtered out, wherein the filtering unit is arranged at least in part as a circuit realized in hardware.

According to another embodiment of the invention, an electronic device is disclosed comprising a local node arranged for operation according to an Ethernet networking protocol using a network stack comprising at least one physical layer (PHY) and communication to at least one link layer or media access controller, said electronic device having a serial interface for connection to a communication network, wherein said network traffic to said electronic device may be filtered and an unwanted data reception addressed to said electronic device filtered out, wherein the electronic device comprises apparatus or control logic for determining a number of data packets received per unit time.

According to another embodiment of the invention, an electronic device is disclosed comprising a local node arranged for operation according to an Ethernet networking protocol using a network stack comprising at least one physical layer (PHY) and communication to at least one link layer or media access controller, said electronic device having a serial interface for connection to a communication network, wherein said network traffic to said electronic device may be filtered and an unwanted data reception addressed to said electronic device filtered out, wherein the electronic device is connected to an external circuit from which it can receive information for determining in the control logic a number of data packets received per unit time.

According to another embodiment of the invention, an electronic device is disclosed comprising a local node arranged for operation according to an Ethernet networking protocol using a network stack comprising at least one physical layer (PHY) and communication to at least one link layer or media access controller, said electronic device having a serial interface for connection to a communication network, wherein said network traffic to said electronic device may be filtered and an unwanted data reception addressed to said electronic device filtered out, wherein the electronic device it comprises apparatus for logging data (47) concerning discarded unwanted data packets and/or recording characteristics about the network traffic.

A computer program, and a computer program recorded on a computer-readable medium is disclosed in another aspect of the invention.

BRIEF DESCRIPTION OF THE DRAWINGS

A more complete understanding of the method and system of the present invention may be had by reference to the following detailed description when taken in conjunction with the accompanying drawings wherein.

DETAILED DESCRIPTION OF THE INVENTION

In a first aspect of the invention a method is implemented which blocks selected network traffic by relying on features present in the Ethernet MAC. The MAC by design, does not propagate packets which are malformed or packets when the MII reception error bus line RX_ERROR is asserted. On other busses where the control signals do not have dedicated separate bus lines, the MAC by design does not propagate packets that are marked with control data indicating an error. (A MAC circuit will also discard a data packet that is valid but has the wrong MAC address, an incorrect MAC address.) A preferred implementation of the invention is a circuit connected between the Ethernet PHY and the Ethernet MAC. Ethernet frames sent by the Ethernet PHY and dropped by the Ethernet MAC do not impact CPU performance. The invention can be implemented with a simple electronic device such as a field programmable gate array, FPGA requiring only a limited amount of resources. Alternatively the invention could be integrated in a PHY, MAC, CPU or other circuit.

Figure 1:
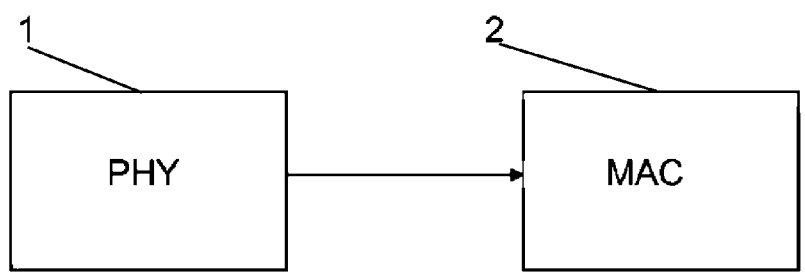
FIG. 1 shows a schematic block diagram from a known Ethernet networking protocol or standard.

FIG. 1 shows a part of a known, standard Ethernet networking protocol illustrating the connection of a physical layer circuit (PHY) 1 to a media access controller (MAC) 2. The PHY and the MAC is the interface between the physical layer and the link layer. The terms link layer and data link layer are used interchangeably.

Figure 3:
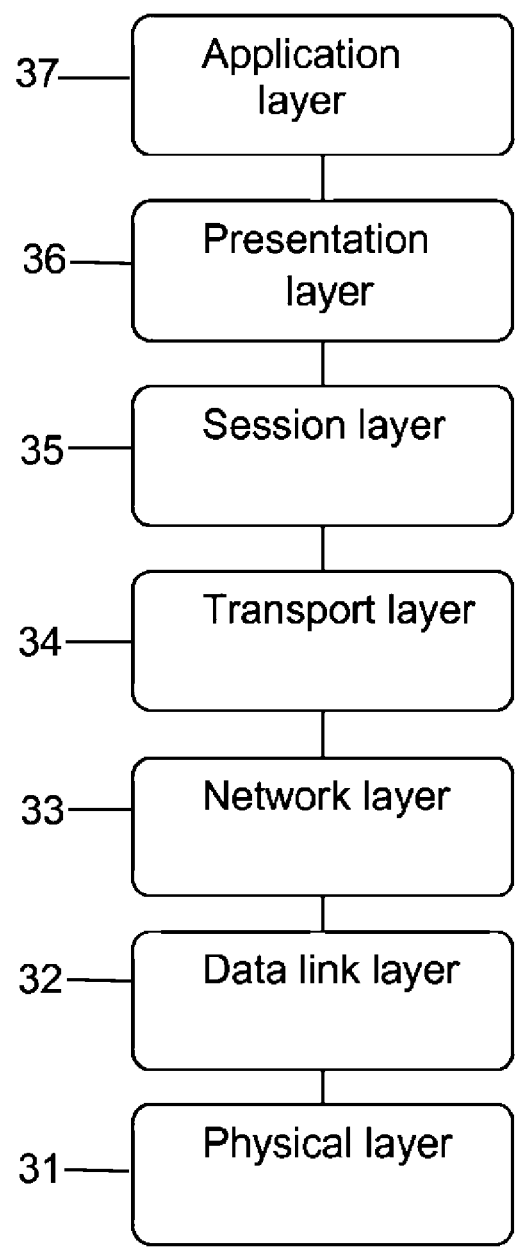
FIG. 3 shows a known model of networking layers, the OSI Open Systems Interconnection Reference Model.

FIG. 3 shows a part of a generally used and widely known model, the OSI Open Systems Interconnection Reference Model. This model describes seven conceptual layers:
31. Physical layer,
32. Data link layer,
33. Network layer,
34. Transport layer,
35. Session layer,
36. Presentation layer and
37. Application layer.

A layer in the OSI model is a collection of conceptually similar functions that provide services to the layer above it and receives service from the layer below it. (See ISO/IEC TR 8802-1:2001 or any standard text about IEEE 802 standards for more information about the OSI model and the variations applicable to different networking standards.) Within some standards, for example IEEE 802 LAN architectures, the Link Layer 2 comprises or is arranged with a Media Access Control (MAC) circuit. The MAC typically provides addressing and channel access control mechanisms that make it possible for several terminals or network nodes to communicate within a multipoint network, such as a local area network (LAN).

FIG. 1 shows a circuit 3 connected between the PHY and the link layer comprising a MAC unit or circuit. The figure shows a filtering unit in the form of a filtering circuit 3 compatible with the MII bus connected between the PHY and MAC unit. The circuit 3 may be embodied in the form of a media independent interface or MII. The MII bus between the PHY 1 and the MAC 2 is arranged with a separate data line RX-D 11 and control line RX_ERROR 12. The figure shows that the filtering circuit has a temporary memory or register 4, filter memory 6, an interface to an external circuit 20, for instance a CPU. The filtering circuit or unit also has a control unit or control logic 8. An error detecting interface in the MII, preferably a reception error bus or line RX_ERROR 9, is connected to a signal line to the MAC 2. The media independent interface (MII) may be a reduced media independent interface (RMII) or another variation of a media independent interface, such as a Gigabit media independent interface (GMII), reduced Gigabit media independent interface (RGMII) or other bus with separate control and data lines.

Figure 2:
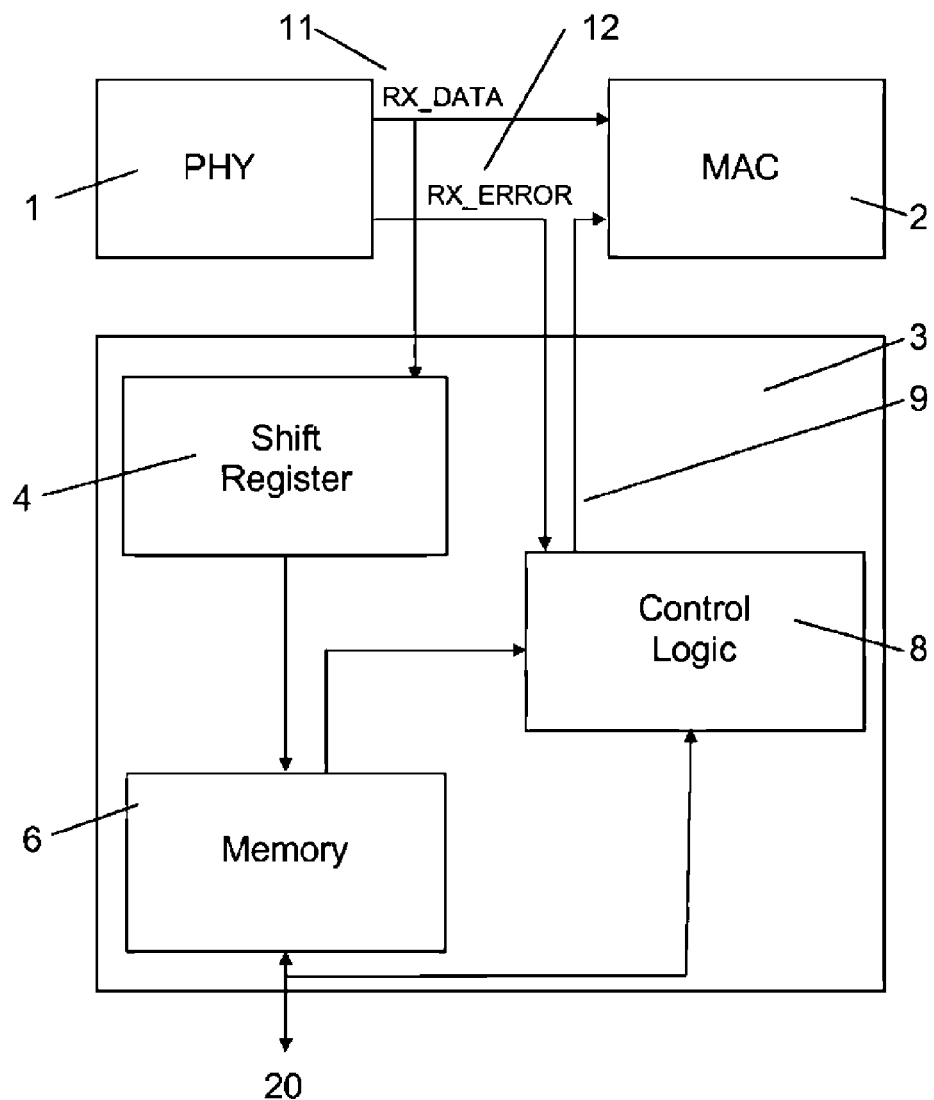
FIG. 2 shows a schematic block diagram of a circuit or device connected between a PHY and a MAC unit according to an embodiment of the invention.

In FIG. 2 the PHY 1 is connected directly to the MAC 2, and the circuit 3 is also connected to the same bus. RX_ERROR is connected through the circuit 3 between PHY and MAC. The circuit has a list of traffic rules, or an access control list, preferably stored in filter memory storage device 6, used for comparison to detect unwanted or wanted network traffic, and this list may be (a) constructed based on traffic analysis or,
(b) a list updated by the embedded system of the electronic device or,
(c) a list of unwanted traffic (blacklist) or,
(d) a list of legitimate traffic (whitelist),
(e) a list provided by the vendor,
(f) a list based on the environment which the embedded system is operating in,
(g) a list from another source,
(h) or any combination of the above,
(i) another access control list.

The traffic rules may be updated and changed by the system, for instance by information routed through external circuit 20 or in the control logic 8. The filtering may be turned on or off, thus letting traffic which matches the list pass without asserting the bus control line when off. When turned on the filtering asserts the bus control line RX_ERROR or another control line, when unwanted data is detected. The selection criteria for turning the filtering scheme on or off may comprise criteria such as:

(a) a limit on number of packets per time unit. The number of packets per time unit may be supplied by the embedded system, or
(b) selectively by the CPU, or
(c) by other means.

Significantly, the filtering circuit 3 does not delay Ethernet Frames by storing them and sending them to the MAC at a later time. The rejected Ethernet frames are discarded, rejected by the MAC circuit in the link layer, and do not reach other layers (such as layers conforming with the OSI model layers 33-37 see FIG. 3) in the network stack of the processor in the embedded network device.

When active, the decision logic module circuit or control logic 8 checks the content of the Ethernet Frames, and matches this to the access control list containing the traffic rules. If there is, for example no match with any data in a white list, the circuit 3 asserts RX_ERROR line 9 of the media independent interface (MII) or other control (RX_ERROR 12) to indicate an error in the Ethernet Frame (see FIG. 2).

The number of data packets received per unit time is noted and may be recorded. This may be carried out within the control logic 8 of the filtering unit 3, or it may be carried out by receiving through a line in to the filtering unit, for example from external circuit 20, information from an external device or circuit about the rate of packets received, which information may be calculated or processed in the control logic 8 to arrive a rate of data packets received per unit time. Filtering may optionally be switched on when the number of data packets received per unit time reaches or exceeds a predetermined number. The number of discard events when unwanted data packets are discarded may be detected and preferably recorded. Data concerning discarded unwanted data packets may be logged and/or information recorded about characteristics such as the amount of network traffic, time of data packet discard. Discarded traffic may be logged by the filtering circuit and stored for processing at a later time. See also step 47 of FIG. 4 and described below in relation to FIG. 4.

A practical and implementable way to filter incoming data transmissions is to compare them with a list of accepted traffic. A white list of network traffic is intended to facilitate normal communication with a device suffering some denial of service attacks. The following invariants are defined:

1. An upper limit of packets processed per time unit. When this limit is reached, white listed traffic may be discarded.
2. A limit of packets processed per time unit. When this limit is reached, traffic not matched in the white list may be discarded.

The following may be a part of the white listed traffic:

1. A list of open, established connections in the network stack, shall be white listed. This is usually a small amount of information that can be transferred from a CPU of the electronic device which includes the circuit 3 employing the invention.
2. A second list of systems that the electronic device has communicated successfully with in the past.

A blacklist of not acceptable network traffic may also be constructed, and be used instead of, or as well as, the white list.

In another embodiment a bus with similar functionality as the media independent interface (MII) or a bus with similar functionality as the serial Gigabit media independent interface (SGMII) may be arranged embodied together with a PHY and MAC inside a circuit, or combined together with another function in another electronic component. For example included in a chip or circuit including both a MAC function and a PHY function; or a chip or circuit that includes both a processor with other functionality that includes either the MAC or the PHY or both the MAC and the PHY.

Figure 5:
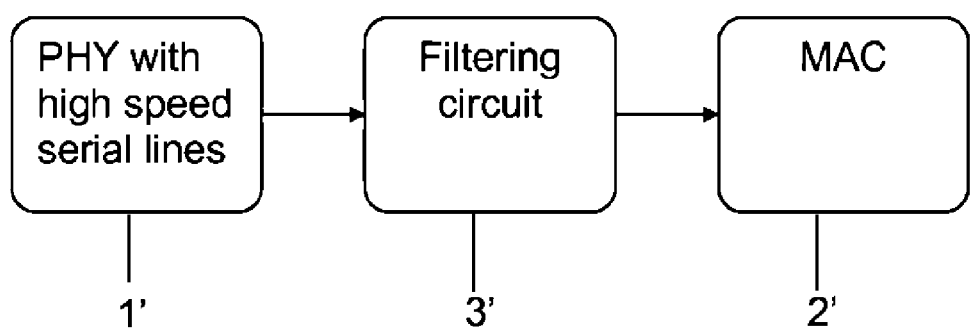
FIG. 5 shows a schematic block diagram comprising a PHY and a MAC unit according to an embodiment of the invention shown in FIG. 2, showing more particularly an embodiment arranged for data communication of around one gigabit or higher.

In another embodiment such Gigabit Ethernet using a high speed serial bus such as serial gigabit media independent interface (SGMII), a circuit such as shown in FIG. 5 may be used. For example Gigabit Ethernet with high speed serial lines where the control lines 11, 12 are missing. For a detected unwanted data packet sending control information after the data, not changing the data, and indicating an error, would result in the same as asserting the MII control lines. The same result can be achieved, that of rejecting a data packet in the MAC after it has been determined to be unwanted during reception in the physical layer, that same result can be achieved by appending control information to the data.

Here, the signals are routed through the filtering circuit and a Error_Propagation ordered_set or other symbol or control information is added to the reception, thereby notifying the MAC with control information of the decision to discard the data. The data itself is left unchanged and valid. Another method which involves using the data line 11 is to change the destination MAC-address of the packet and recalculate the CRC on the fly, thereby producing a valid packet, but with the wrong MAC address, which the MAC discards.

In yet another embodiment of the invention the circuit connected between the PHY and the MAC which filters packets as they are propagating could be implemented solely in the MAC. This may require that a custom MAC would be needed, however filtering functionality according to the invention could be a feature built into a MAC.

In yet another embodiment of the invention the circuit connected between the PHY and the MAC which filters packets as they are propagating could be implemented solely in the PHY. This may require that a custom PHY would be needed, however filtering functionality according to an aspect of the invention could be a feature built into a PHY circuit.

Figure 4:
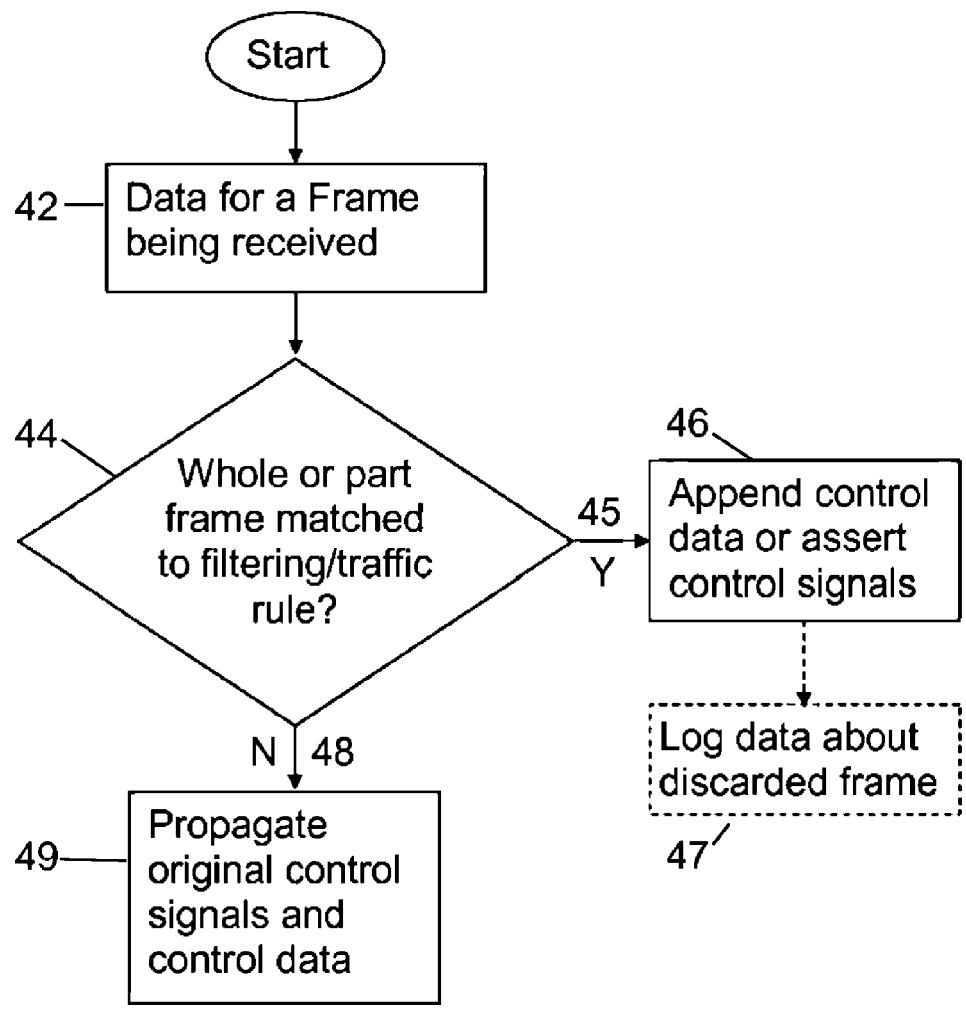
FIG. 4 shows a schematic flowchart for a method according to an aspect of the embodiment of the invention shown in FIG. 2.

FIG. 4 shows a simplified flowchart for one or more methods according to another aspect of the invention. The figure shows:

42 Data for a frame, eg Ethernet frame, is received in the physical layer
44 data in part or whole of the frame is compared with the traffic rules for filtering;

45 if unwanted data is detected Y—then
46 control signal asserted or control data appended (so that frame is subsequently discarded in the MAC)
47 if control signal is asserted or control data appended then data about that discarded frame may be logged;
48 if unwanted traffic not detected N then
49 the packet is propagated with original control signal(s) and original data to another network layer 33-37.

The electronic device may be installed and configured for use in a local node of a component connected to, and controlled by, a control system. Typically as a component controlled by a control system, a component such as a measuring instrument for example a sensor or transducer, or an actuator such as a valve, motor, pump, switch, or another component used in the control of industrial processes such as a pulp & paper process, metal forming process, or for controlling equipment such as transformers, breakers, isolators, switches and so on used eg in feeder installations, switch yards and substations for the generation, transmission or distribution of electrical power.

The functions of the filtering unit 3 or filtering circuit may be carried out by processing digital functions, algorithms and/or computer programs and/or by analogue components or analogue circuits or by a combination of both digital and analogue functions.

The methods of the invention may be carried out by means of one or more computer programs comprising computer program code or software portions running on a computer or a processor. The microprocessor (or processors) comprises a central processing unit CPU performing the steps of the method according to one or more facets of the invention. This is performed with the aid of one or more said computer programs, such as, which are stored at least in part in a memory storage device such as memory 6 and/or in control logic 8 and as such accessible by the one or more processors. The processor or processors may be in a control unit, or part thereof. It is to be understood that said computer programs may also be run on one or more general purpose industrial microprocessors or computers instead of one or more specially adapted computers or processors.

The computer program comprises computer program code elements or software code portions that make the computer perform methods such as that shown in the flowchart of FIG. 4 using equations, algorithms, data, stored values and calculations previously described. A part of the program may be stored in a processor as above, but also in a ROM, RAM, PROM, EPROM or EEPROM chip or similar memory means. The program in part or in whole may also be stored on, or in, other suitable computer readable medium such as a magnetic disk, CD-ROM or DVD disk, hard disk, magneto-optical memory storage means, in volatile memory, in flash memory, as firmware, stored on a data server or on one or more arrays of data servers. Other known and suitable media, including removable memory media such as memory sticks or other removable flash memories, hard drives etc. may also be used.

It should be noted that while the above describes exemplifying embodiments of the invention, there are several variations and modifications which may be made to the disclosed solution without departing from the scope of the present invention as defined in the appended claims.

What is claimed is:

1. A method of limiting an amount of network traffic reaching an electronic device operating an Ethernet networking protocol and using a network stack comprising at least one physical layer communicating with at least one link layer where data received is propagated to one or more higher layers of said network stack, said electronic device being connected to a communication network, said network traffic is filtered and an unwanted data reception addressed to said electronic device is filtered out, the method comprising:
  receiving said network traffic in said at least one physical layer of said electronic device,
  comparing said network traffic to at least one access control list,
  detecting said unwanted data reception, and
  sending a signal causing said unwanted data reception to be rejected and discarded at said link layer or media access controller before said unwanted data reception reaches said one or more higher layers of said network stack of said electronic device, characterised by switching on filtering dependent on a number of data packets received per unit time and inspecting said network traffic during reception from said at least one said physical layer to said at least one link layer or media access controller.

2. The method according to claim 1, wherein said filtering comprises inspecting said network traffic during reception and propagation from the at least one physical layer to the at least one link layer, and comparing said network traffic with information from the at least one access control list.

3. The method according to claim 1, characterised by detecting said unwanted data reception and asserting a control signal in the media access controller of said electronic device by switching a line, bus or circuit to a predetermined potential such that the media access controller rejects said unwanted data reception transmitted from the physical layer.

4. The method according to claim 1, characterised by detecting said unwanted data reception and appending control data to said reception such that the media access controller rejects said unwanted data reception transmitted from the physical layer.

5. The method according to claim 3, characterised by asserting a control line such that the media access controller detects a receiver error (RX_ERROR) and/or negated data valid (RX_DV) and/or other control line and discards the whole Ethernet frame containing said unwanted data reception.

6. The method according to claim 1, characterised by logging data concerning discarded unwanted data packets and recording characteristics about the network traffic.

7. The method according to claim 1, characterised by switching on filtering dependent on an external signal and inspecting said network traffic during reception from the at least one physical layer to the at least one link layer or media access controller.

8. The method according to claim 1, characterised by switching on filtering dependent on the number of data packets received per unit time according to at least one predetermined number of data packets.

9. The method according to claim 1, characterised by inspecting said network traffic during reception from the at least one physical layer beginning inspection on data forming a partially received data packet.

10. The method according to claim 1, characterised by inspecting said network traffic during reception from the at least one physical layer beginning inspection on receipt of a complete data packet.

11. The method according to claim 1, characterised by inspecting said network traffic during reception from the at least one physical layer to the at least one link layer or media access controller by comparing with data in any from the group of: a list of accepted traffic, information based on an analysis of traffic, a list updated by a processor of said electronic device, a list of non-accepted traffic, and an access control list.

12. An electronic device arranged for operation according to an Ethernet networking protocol using a network stack comprising at least one physical layer and communication to at least one link layer or media access controller, said electronic device comprising:
- a filtering unit adapted to filter network traffic to said electronic device and filter out an unwanted data reception addressed to said electronic device, said filtering unit being connected between said at least one physical layer and said at least one link layer or media access controller, the filtering unit having at least one switchable line or bus and control logic for inspecting said network traffic during reception from said at least one physical layer to said at least one link layer or media access controller, for comparing said network traffic to at least one access control list, and for detecting said unwanted data reception, said filtering unit being adapted to send a signal causing said unwanted data reception to be rejected and discarded by said at least one link layer or media access controller before said unwanted data reception reaches another layer of said network stack, and
- an apparatus or control logic for determining a number of data packets received per unit time, wherein filtering by said filtering unit initiates depending on said number of data packets received per unit time.

13. The device according to claim 12, characterised in that the filtering unit is adapted to assert a control line error by means of the switchable line or bus, upon detection of said unwanted data reception.

14. The device according to claim 12, characterised in that the filtering unit is adapted to append control data upon detection of said unwanted data reception.

15. The device according to claim 12, characterised in that the filtering unit is arranged at least in part as a circuit embodied in hardware.

16. The device according to claim 12, characterised in that the at least one link layer comprises a media access controller which is adapted to reject said unwanted data reception transmitted from the physical layer so that said unwanted data reception does not propagate to other layers of said network stack.

17. The device according to claim 13, characterised in that it is connected to an external circuit from which it is arranged to receive information for determining in the control logic said number of data packets received per unit time.

18. The device according to claim 13, further comprising an apparatus for logging data concerning discarded unwanted data packets and/or recording characteristics about the network traffic.

19. A computer program product stored on a non-transitory medium, said program product when executed by a processor operates to configure the processor to perform a method of limiting an amount of network traffic reaching an electronic device, said electronic device operating an Ethernet networking protocol using a network stack comprising at least one physical layer communicating with at least one link layer where data received is propagated to one or more higher layers of said network stack, said electronic device being connected to a communication network, said network traffic is filtered and an unwanted data reception addressed to said electronic device is filtered out, the method comprising:
- receiving said network traffic in said at least one physical layer of said electronic device,
- comparing said network traffic to at least one access control list,
- detecting said unwanted data reception, and
- sending a signal causing said unwanted data reception to be rejected and discarded at said link layer or media access controller before said unwanted data reception reaches said one or more higher layers of said network stack of said electronic device, characterised by switching on filtering dependent on a number of data packets received per unit time and inspecting said network traffic during reception from the at least one said physical layer to the at least one link layer or media access controller.

20. A system for monitoring and controlling an industrial process or for controlling and monitoring equipment in a system for generation, transmission, or distribution of electricity, comprising:
- an electronic device arranged for operation according to an Ethernet networking protocol using a network stack comprising at least one physical layer and communication to at least one link layer or media access controller, said electronic device having a filtering unit adapted to filter network traffic to said electronic device and filter out an unwanted data reception addressed to said electronic device, said filtering unit being connected between said at least one physical layer and said at least one link layer or media access controller, said filtering unit having at least one switchable line or bus and control logic for inspecting said network traffic during reception from said at least one physical layer to said at least one link layer or media access controller, for comparing said network traffic to at least one access control list, and for detecting said unwanted data reception, said filtering unit being adapted to send a signal causing said unwanted data reception to be rejected and discarded by said at least one link layer or media access controller before said unwanted data reception reaches another layer of said network stack, and
- an apparatus or control logic for determining a number of data packets received per unit time, wherein filtering by said filtering unit initiates depending on said number of data packets received per unit time.

* * * * *